US011084761B2

(12) United States Patent
Olson et al.

(10) Patent No.: US 11,084,761 B2
(45) Date of Patent: Aug. 10, 2021

(54) METHOD OF PRESSURE SINTERING AN ENVIRONMENTAL BARRIER COATING ON A SURFACE OF A CERAMIC SUBSTRATE

(71) Applicant: HONEYWELL INTERNATIONAL INC., Morris Plains, NJ (US)

(72) Inventors: Donald Martin Olson, Dover, NJ (US);
Reza Oboodi, Morris Plains, NJ (US);
James Piascik, Randolph, NJ (US);
Terence Whalen, Morristown, NJ (US);
Bahram Jadidian, Watchung, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/131,279

(22) Filed: Sep. 14, 2018

(65) Prior Publication Data

US 2020/0087220 A1 Mar. 19, 2020

(51) Int. Cl.
*C04B 41/91* (2006.01)
*B05D 3/04* (2006.01)
*B05D 3/10* (2006.01)
*C04B 41/00* (2006.01)
*C04B 41/50* (2006.01)
*C04B 41/53* (2006.01)
*C04B 41/87* (2006.01)
*F01D 25/00* (2006.01)

(52) U.S. Cl.
CPC ............ *C04B 41/91* (2013.01); *B05D 3/0473* (2013.01); *B05D 3/104* (2013.01); *C04B 41/009* (2013.01); *C04B 41/5024* (2013.01); *C04B 41/5361* (2013.01); *C04B 41/87* (2013.01); *F01D 25/005* (2013.01); *F05D 2220/32* (2013.01); *F05D 2230/22* (2013.01); *F05D 2230/90* (2013.01); *F05D 2240/11* (2013.01); *F05D 2240/12* (2013.01); *F05D 2240/30* (2013.01); *F05D 2240/35* (2013.01); *F05D 2300/2261* (2013.01); *F05D 2300/2283* (2013.01)

(58) Field of Classification Search
CPC ...................................................... C04B 41/91
USPC ...................................................... 427/377
See application file for complete search history.

(56) References Cited

U.S. PATENT DOCUMENTS

| 3,690,921 A | 9/1972 | Elmore |
| 4,604,299 A | 8/1986 | DeLuca et al. |
| 4,647,477 A | 3/1987 | DeLuca |
| 4,721,549 A | 1/1988 | Bogenschutz et al. |
| 4,913,784 A | 4/1990 | Bogenschutz et al. |
| 5,318,836 A | 6/1994 | Ito et al. |
| 5,547,482 A * | 8/1996 | Chalk ..................... C03B 19/06 65/17.2 |
| 5,549,770 A * | 8/1996 | Barker ................. C04B 35/6455 156/89.27 |
| 7,323,247 B2 | 1/2008 | Raybould et al. |
| 8,673,400 B2 | 3/2014 | Kirby et al. |
| 8,876,481 B2 | 11/2014 | Huang et al. |
| 9,085,462 B2 | 7/2015 | Shibata et al. |
| 9,290,847 B2 | 3/2016 | Wu et al. |
| 9,428,650 B2 | 8/2016 | Meschter et al. |
| 2005/0211702 A1 | 9/2005 | Gigl et al. |
| 2012/0315492 A1* | 12/2012 | Pujari ..................... C04B 41/52 428/446 |
| 2017/0121232 A1* | 5/2017 | Nelson .................. C04B 41/009 |
| 2017/0247787 A1* | 8/2017 | Saha ....................... C04B 41/52 |
| 2018/0038276 A1 | 2/2018 | Durrett et al. |

FOREIGN PATENT DOCUMENTS

EP 2192098 A2 6/2010

OTHER PUBLICATIONS

Lee, Rare Earth Silicate Environmental Barrier Coatings for SiC/SiC Composites and Si3N4 Ceramics, Journal of European Ceramic Society, Dec. 25, 2005, p. 1705-1715 (Year: 2005).*
Jayaseelan, Formation of Environmental Barrier Coating on Si3N4 by Gas-Pressure Sintering, 28th International Conference on Advanced Ceramics and Composites, The American Ceramic Society, 2004, p. 497-500 (Year: 2004).*
Wang, Fabrication and thermal shock resistance of multilayer gamma-Y2Si2O7 environmental barrier coating on porous Si3N4, Journal of the European Ceramic Society, 36, 2016, p. 689-695 (Year: 2016).*
Jayaseelan et al., Formation of Environmental Barrier Coating on Si3N4 by Gas-Pressure Sintering, 28th International Conference on Advanced Ceramics and Composites B: Ceramic Engineering and Science Proceedings, Mar. 26, 2008, pp. 497-500, Nygoya, Japan.

* cited by examiner

*Primary Examiner* — Tabatha L Penny
(74) *Attorney, Agent, or Firm* — Lorenz & Kopf, LLP

(57) ABSTRACT

A method of pressure sintering an environmental barrier coating on a surface of a ceramic substrate to form an article includes the steps of etching the surface of the ceramic substrate to texture the surface, disposing an environmental barrier coating on the etched surface of the ceramic substrate wherein the environmental barrier coating includes a rare earth silicate, and pressure sintering the environmental barrier coating on the etched surface of the ceramic substrate in an inert or nitrogen atmosphere at a pressure of greater than atmospheric pressure such that at least a portion of the environmental barrier coating is disposed in the texture of the surface of the ceramic substrate thereby forming the article.

20 Claims, 5 Drawing Sheets under the environmental barrier coating, e.g. as shown in FIGS. 3 and 4. The silica layer prevents the environmental barrier coating from making intimate contact with the top surface of ceramic material which results in limited protection and in many cases leads to delamination of the environmental barrier coating.

Accordingly, it is desirable to develop an improved method of depositing an environmental barrier coating on a ceramic material. Furthermore, other desirable features and characteristics of the present disclosure will become apparent from the subsequent detailed description of the disclosure and the appended claims, taken in conjunction with the accompanying drawings and this background.

SUMMARY OF THE DISCLOSURE

This disclosure provides a method of pressure sintering an environmental barrier coating on a surface of a ceramic substrate to form an article. The method includes the steps of etching the surface of the ceramic substrate to texture the surface, disposing an environmental barrier coating on the etched surface of the ceramic substrate wherein the environmental barrier coating includes a rare earth silicate, and pressure sintering the environmental barrier coating on the etched surface of the ceramic substrate in an inert or nitrogen atmosphere at a pressure of greater than atmospheric pressure such that at least a portion of the environmental barrier coating is disposed in the texture of the surface of the ceramic substrate thereby forming the article.

This disclosure also provides a second embodiment of the method. This embodiment includes the steps of etching the surface of the ceramic substrate to texture the surface and disposing an environmental barrier coating on the etched surface of the ceramic substrate wherein the environmental barrier coating includes a rare earth silicate. The embodiment also includes the step of pressure sintering the environmental barrier coating on the etched surface of the ceramic substrate in a hot isostatic press furnace utilizing an inert or nitrogen atmosphere at a pressure of greater than atmospheric pressure and at a temperature of from about 1400° C. to about 1700° C. such that at least a portion of the environmental barrier coating is disposed in the texture of the surface of the ceramic substrate thereby forming the article. In this embodiment, the step of pressure sintering produces a mass of the environmental barrier coating including from about 0.1 to about 20 weight percent of liquid glass and the liquid glass is disposed in the texture of the surface of the ceramic substrate. Moreover, in this embodiment, the environmental barrier coating has a thickness of from about 0.5 mils to about 20 mils after the step of pressure sintering. Furthermore, in this embodiment, the article exhibits less than a 50 percent debit in flexural strength as compared to a ceramic substrate that is free of the environmental barrier coating, as determined using ASTM C1161. The article also exhibits an adhesion of greater than about 1,000 psi as determined using ASTM C633 measured after exposure to steam at a temperature of about 1200° C. for a time of greater than about 2,000 hours.

This disclosure further provides an article including a ceramic substrate having a textured surface and an environmental barrier coating disposed on the ceramic substrate. In this article, the environmental barrier coating is pressure sintered in an inert or nitrogen atmosphere at a pressure of greater than atmospheric pressure such that at least a portion of the environmental barrier coating is disposed in the texture of the surface of the ceramic substrate. Moreover, the environmental barrier coating includes a rare earth silicate. The article exhibits less than a 50 percent debit in flexural strength as compared to a ceramic substrate that is free of the sintered environmental barrier coating, as determined using ASTM C1161. The article also exhibits an adhesion of greater than about 1,000 psi as determined using ASTM C633 measured after exposure to steam at a temperature of about 1200° C. for a time of greater than about 2,000 hours.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the disclosure. Furthermore, there is no intention to be bound by any theory presented in the preceding background or the following detailed description.

Embodiments of the present disclosure are generally directed to methods of pressure sintering environmental barrier coatings (EBCs) on ceramic substrates and articles formed therefrom. For the sake of brevity, conventional techniques related thereto may not be described in detail herein. Moreover, the various tasks and process steps described herein may be incorporated into a more comprehensive procedure or process having additional steps or functionality not described in detail herein. In particular, various steps in the manufacture of such articles are well-known and so, in the interest of brevity, many conventional steps will only be mentioned briefly herein or will be omitted entirely without providing the well-known process details.

Figure 1:
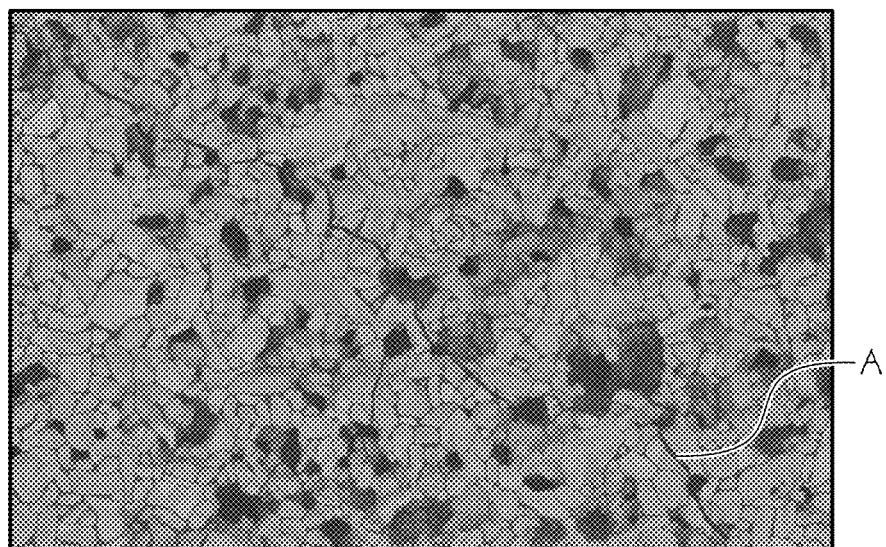
FIG. 1 is a photograph at 2500× magnification of an environmental barrier coating of the prior art that includes cracks through which steam can enter, e.g. as set forth in the Examples relative the Comparatives Articles 1-3.
Figure 2A:
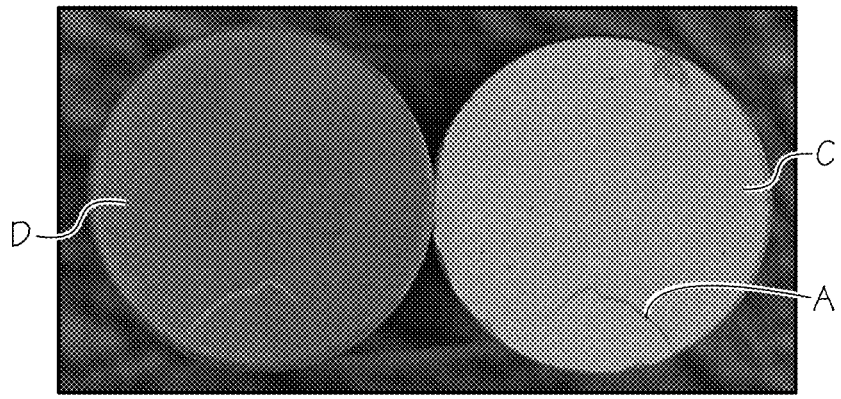
FIG. 2A is a photograph of 1" discs similar to the Comparative Article 1 of the Examples showing complete loss of adhesion of the environmental barrier coating to a silicon nitride ceramic substrate after about 955 cycles of steam exposure wherein each cycle is approximately 30 minutes.
Figure 2B:
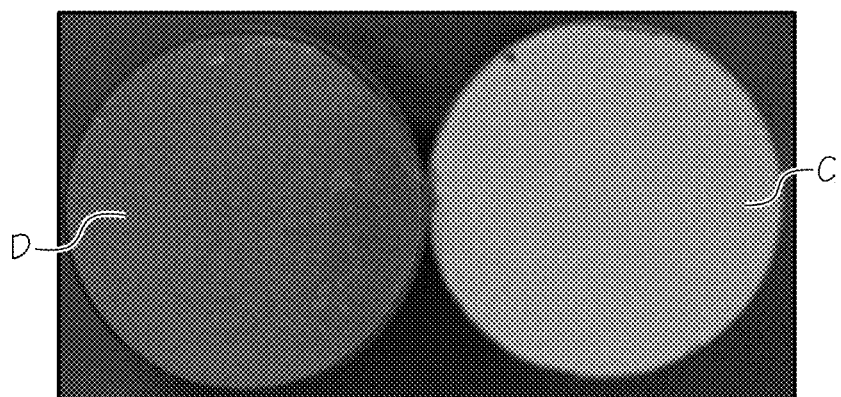
FIG. 2B is a photograph of 1" discs similar to the Comparative Article 1 of the Examples showing complete loss of adhesion of the environmental barrier coating to a silicon nitride ceramic substrate after about 1200 cycles of steam exposure wherein each cycle is approximately 30 minutes.
Figure 3:
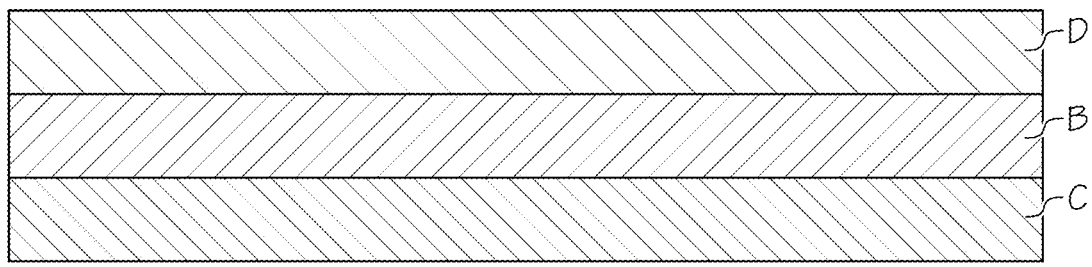
FIG. 3 is a side cross-sectional view of a prior art environmental barrier coating disposed on a ceramic substrate, e.g. similar to the Comparative Article 2 of the Examples.
Figure 4:
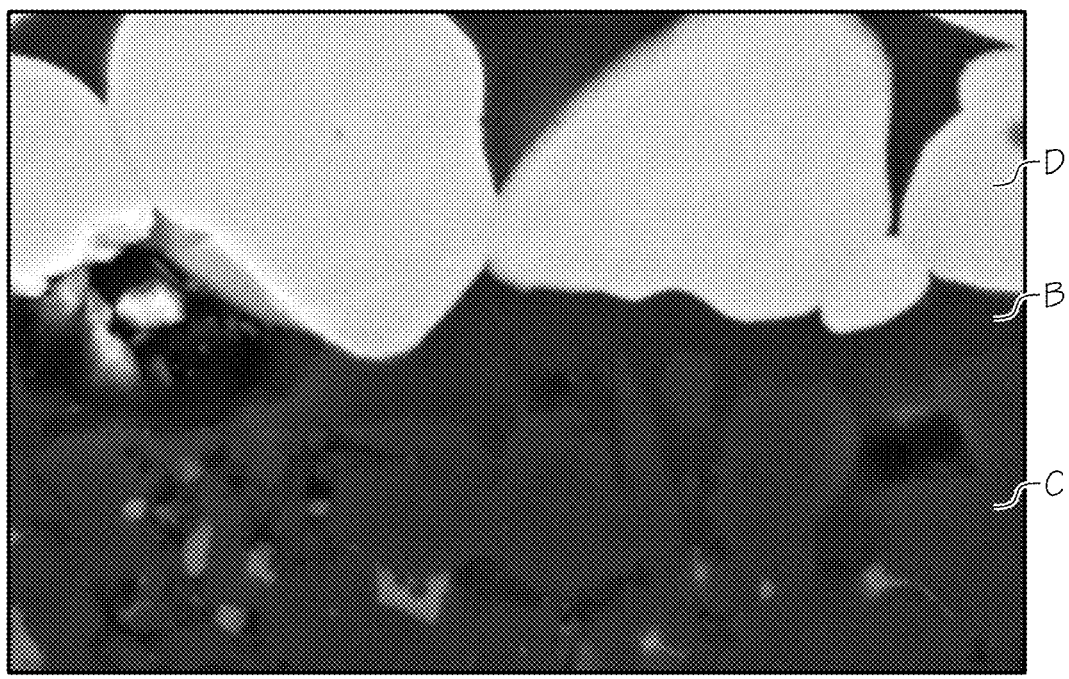
FIG. 4 is an electron micrograph of a prior art environmental barrier coating disposed on a ceramic substrate wherein a silica layer is disposed therebetween, e.g. similar to the Comparative Article 2 of the Examples.
Figure 5A:
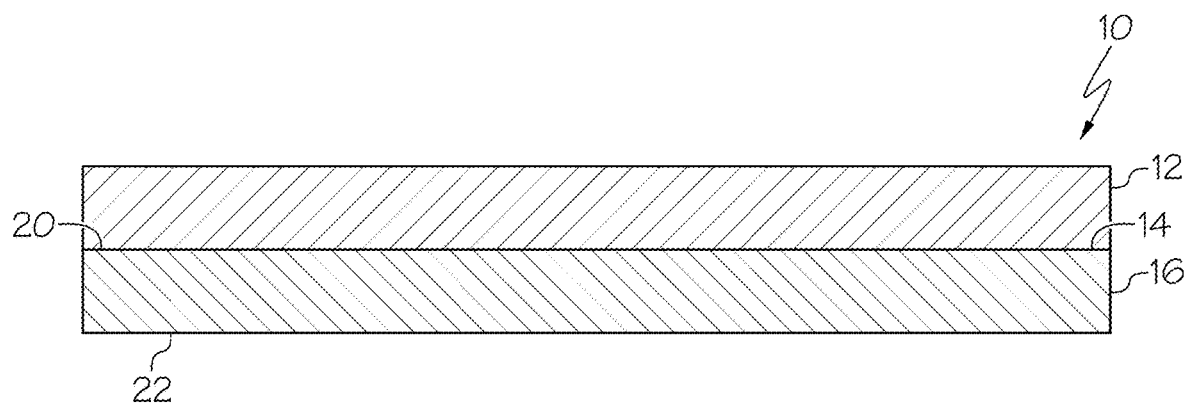
FIG. 5A is a first side cross-sectional view of one embodiment of this disclosure including environmental barrier coating disposed on and in direct contact with a surface of a ceramic substrate wherein there is no silica layer is disposed therebetween, e.g. similar to the Articles of this Disclosure of the Examples.

Article:

This disclosure provides an article 10 and a method of forming the article 10. Various non-limiting embodiments of the article 10 are shown in FIGS. 5 and 6. The article 10 itself is not particularly limited. In various embodiments, the article 10 is any portion of a vehicle, aircraft, ship, train, etc. In another embodiment, the article 10 is any portion of an aerospace vehicle, engine, or application. Alternatively, the article 10 may be any portion of an engine, e.g. a gas turbine engine, such as an aircraft engine. Non-limiting examples of such articles 10 include airfoils (e.g., blades and vanes), combustor liners, and shrouds. Alternatively, the article 10 may be any portion of an engine for a vehicle, ship, train, etc. Alternatively, the article 10 may be used in any industry including, but not limited to, the automobile industry, the aerospace industry, transportation industry, etc. Even further, the article 10 may be an article used in any high temperature and/or pressure environment including, but not limited to, power plants, mining, petroleum and oil refining, fracking, under water applications, deep sea applications, etc. In one embodiment, the article 10 is a gas turbine engine component. In another embodiment, the article 10 is a monolithic shroud.

The article 10 includes a ceramic substrate 16. The ceramic substrate 16 may include or be a monolithic ceramic or a ceramic matrix composite. A ceramic is an inorganic solid that may include metals, non-metals, or metalloid atoms primarily held together with ionic and/or covalent bonds. Ceramics may be crystalline, semi-crystalline, partially crystalline, or amorphous. The ceramic substrate 16 may include ceramic material throughout, such that the substrate is essentially 100 percent ceramic. Alternatively, the ceramic substrate 16 may be defined as a substrate that includes a ceramic coating disposed over a metal core.

The ceramic substrate 16 is not particularly limited in size, dimensions, etc. The ceramic substrate 16 may be or include any ceramic known in the art. For example, the ceramic substrate 16 may be or include silicon nitride, silicon carbide, silicon-carbide-silicon carbide composites, silicon oxynitride, SiAlON materials (materials that include silicon, aluminum, oxygen, and nitrogen), silicon dioxide, and combinations thereof. In other embodiments, the ceramic substrate 16 may be or include silicon nitride, silicon carbide, silicon-carbide-silicon carbide composites, or combinations thereof. In various embodiments, the ceramic substrate 16 may be or include from about 50 to about 100 weight percent, or from about 80 to about 100 weight percent, or from about 99 to about 100 weight percent of silicon nitride, silicon carbide, silicon oxynitride, SiAlON materials (materials that include silicon, aluminum, oxygen, and nitrogen), silicon dioxide, and combinations thereof. In various non-limiting embodiments, all values and ranges of values including and between those set forth above are hereby expressly contemplated for use herein.

The ceramic substrate 16 has a surface 14, which may be defined as a top or bottom surface of the substrate 16. The surface 14 is textured. The surface 14 typically includes the texture 18 disposed therein. Alternatively, the surface 14 may be described as having texture 18 disposed "thereon." The texture 18 is not particularly limited in size, e.g. diameter or depth. In various embodiments, the texture 18 has a depth of from greater than zero up to about 50 micrometers, e.g. from about 1 to about 50, about 5 to about 45, about 10 to about 40, about 15 to about 35, about 20 to about 30, or about 25 to about 30, micrometers. The texture 18 may be formed using any method known in the art. For example, the texture may be formed by etching, as described in greater detail below, which typically removes material between grains/particles of the ceramic substrate 16. In various non-limiting embodiments, all values and ranges of values including and between those set forth above are hereby expressly contemplated for use herein.

The article 10 also includes an environmental barrier coating (EBC) 12 disposed on the surface 14 of the ceramic substrate 16, as shown in FIGS. 5A-C and 6. The environmental barrier coating 12 is typically pressure sintered onto the surface 14 of the ceramic substrate 16, as described in greater detail below. Alternatively, the environmental barrier coating 12 may be described as pressure sintered onto the ceramic substrate 16. The environmental barrier coating 12 is typically disposed on and in direct contact with the ceramic substrate 16. In other words, there is typically no intervening layer disposed between the environmental barrier coating 12 and the ceramic substrate 16. For example, there is typically no oxide layer and/or silica layer disposed between the environmental barrier coating 12 and the ceramic substrate 16, e.g. as shown in FIGS. 5A-C and 6. This lack of oxide layer and/or silica layer of 5A-C and 6 can be contrasted with the presence of such layers as set forth in FIGS. 1-4. Most typically, the environmental barrier coating 12 is disposed in the texture 18, e.g. as shown in FIG. 6. The pressure sintering may be the cause of the lack of the oxide layer and/or silica layer disposed between the sintered environmental barrier coating 12 and the ceramic substrate 16.

The environmental barrier coating 12 may be described as an outermost layer of the article 10, e.g. as shown in 5A-C and 6. In other words, the environmental barrier coating 12 may be an exterior layer of the article 10 with no additional layer disposed on top of it. As such, the environmental barrier coating 12 may be exposed to the environment. Similarly, the ceramic substrate 16 may be described as a second outermost layer of the article 10, e.g. disposed opposite the environmental barrier coating 12, as shown in FIG. 5A. The ceramic substrate 16 typically has a first side 20 that is in direct contact with the environmental barrier coating 12 and, as such, is not exposed to the environment. At the same time, the ceramic substrate 16 typically has a second side 22, disposed opposite the first side 20 in direct contact with the environmental barrier coating 12. This second side 22 can be described as the second outermost layer of the article 10 because it is also exposed to the environment. In such a configuration, both the environmental barrier coating 12 and the ceramic substrate 16 are exposed to the environment as "top" and "bottom" layers of the article 10, respectively. An example of such a configuration is shown in FIG. 5A.

Figure 5B:
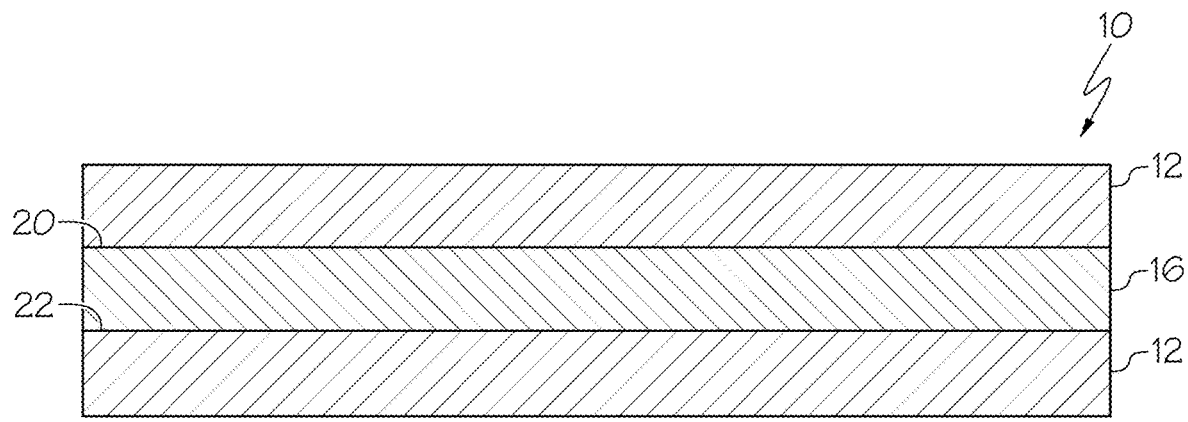
FIG. 5B is a second side cross-sectional view of one embodiment of this disclosure including environmental barrier coating disposed on and in direct contact with a first surface of a ceramic substrate and a second surface of the ceramic substrate, wherein there is no silica layer is disposed between the environmental barrier coating and the first surface or the environmental barrier coating and the second surface.
Figure 6:
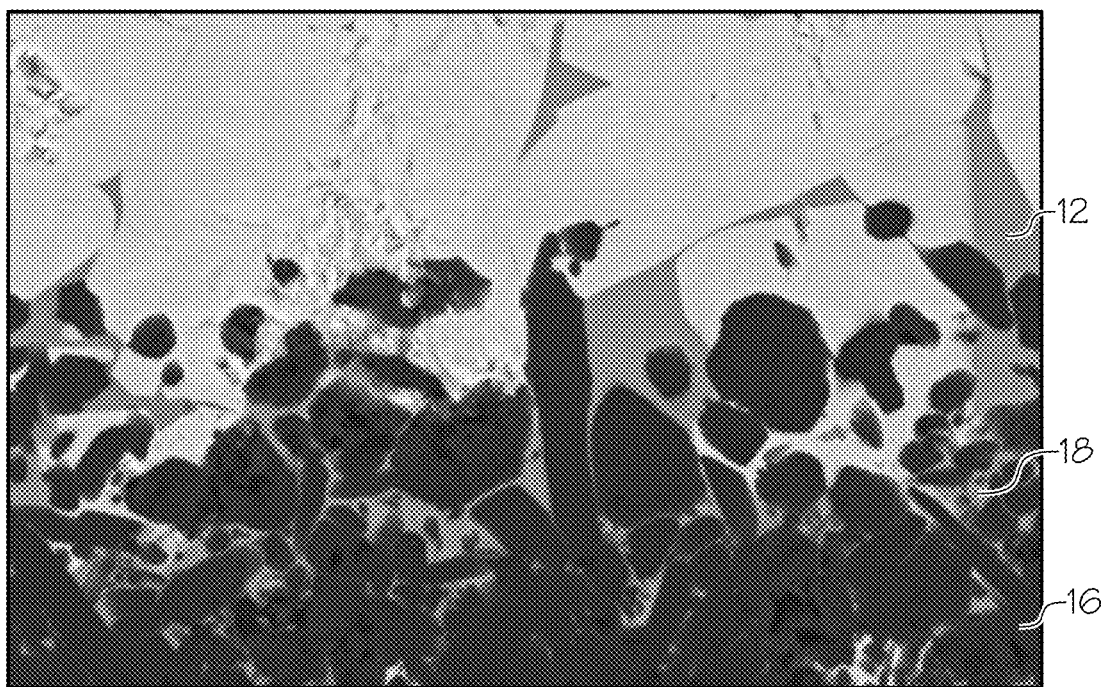
FIG. 6 is an electron micrograph of another embodiment of this disclosure including a ceramic substrate having texture and a sintered environmental barrier coating disposed on and in direct contact with the ceramic substrate and in the texture such that there is no oxide layer and/or silica layer disposed between the environmental barrier coating and the surface of the ceramic substrate, e.g. similar to the Articles of this Disclosure of the Examples.

In other embodiments, the environmental barrier coating 12 is disposed on both the first side 20 and the second side 22 of the ceramic substrate 16, e.g. as shown in FIG. 5B. In such a configuration, a first environmental barrier coating 12 and a second environmental barrier coating 12 may sandwich the ceramic substrate 16 therebetween. In such a configuration, there is also no silica and/or oxide layer disposed between the environmental barrier coating 12 and the (second side 22) of the ceramic substrate 16. Again, in such a configuration, the environmental barrier coating 12 is disposed on and in direct contact with the (second side 22 of the) ceramic substrate 16.

Figure 5C:
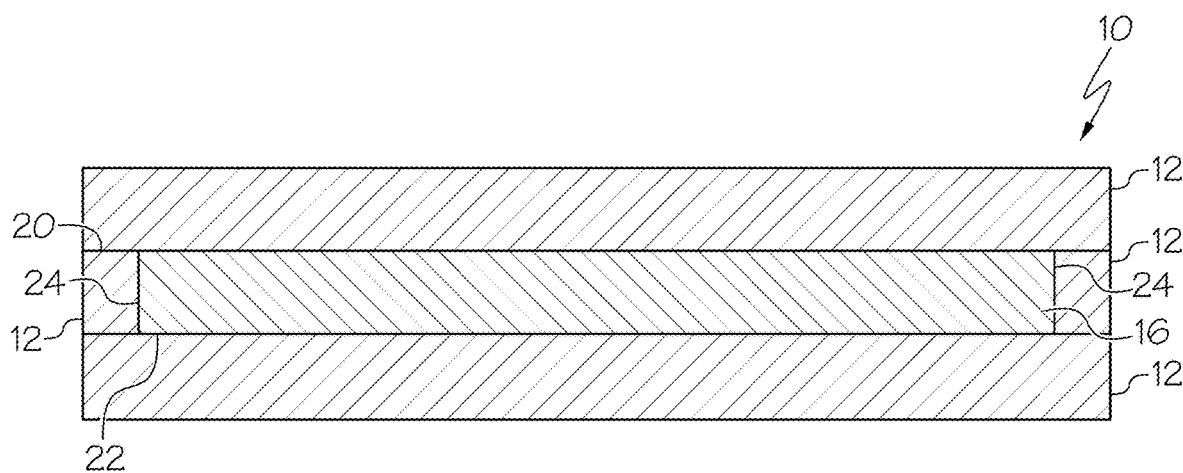
FIG. 5C is a third side cross-sectional view of one embodiment of this disclosure including environmental barrier coating disposed on and in direct contact with a first surface of a ceramic substrate and a second surface of the ceramic substrate, and also on and in direct contact with edges of the ceramic substrate, wherein there is no silica layer is disposed between the environmental barrier coating and the first surface or the environmental barrier coating and the second surface or the environmental barrier coating and the edges of the ceramic substrate.

Even further, the environmental barrier coating 12 may be disposed on one or more edges 24 of the ceramic substrate 16, e.g. as shown in FIG. 5C. The environmental barrier coating 12 may be disposed on one or more of the edges 24 of the ceramic substrate 16 and may or may not be disposed on the second side 22 of the ceramic substrate 16. Just as above, in such a configuration, there is no silica and/or oxide layer disposed between the environmental barrier coating 12 and the edges 24 of the ceramic substrate 16. In such a configuration, the environmental barrier coating 12 is disposed on and in direct contact with the edges 24 of the ceramic substrate 16. In any of the aforementioned embodiments, the environmental barrier coating 12 disposed on the first surface 20, the environmental barrier coating 12 disposed on the second surface 22, and/or the environmental barrier coating 12 disposed on the edges 24, may be the same as each other or may be different. Typically, each environmental barrier coating 12 would be the same and would each be applied using the pressure sintering process described herein.

The environmental barrier coating 12 may include, be, consist essentially of, or consist of, a rare earth silicate. For example, the environmental barrier coating 12 may include a binder, such as a polymeric binder, when first applied to the ceramic substrate 16. However, after a step of debinding, the polymeric binder may be burned away such that the environmental barrier coating 12 then no longer includes such a binder and is, consists essentially of, or consists of, the rare earth silicate. In other words, the composition of the environmental barrier coating 12 may be different depending on which stage in the method it is evaluated. The terminology "consist essentially of" may describe various embodiments wherein the environmental barrier coating 12 is free of, or includes less than 5, 4, 3, 2, 1, 0.5, or 0.1, weight percent of, a binder, a non-rare earth silicate, inorganic compounds including any one or more described below that is not a rare earth silicate, and/or organic compounds, and the like. Similarly, the environmental barrier coating 12 may include a single rare earth silicate to the exclusion of other rare earth silicates. In various non-limiting embodiments, all values and ranges of values including and between those set forth above are hereby expressly contemplated for use herein.

The environmental barrier coating 12 may be any known in the art. For example, the rare earth silicate may be or include at least one rare earth monosilicate (e.g. $RE_2SiO_5$, where RE is a rare earth element), at least one rare earth disilicate (e.g. $RE_2Si_2O_7$, where RE is a rare earth element), or combinations thereof. The rare earth element may include at least one of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium). In various embodiments, the rare earth silicate is $Y_2SiO_5$, $Gd_2SiO_5$, $Er_2SiO_5$, $Yb_2SiO_5$, or $Lu_2SiO_5$, or combinations thereof.

In some examples, in addition to the at least one rare earth silicate, the environmental barrier coating 12 may include at least one of a free rare earth oxide, an aluminosilicate, or an alkaline earth aluminosilicate. For example, the environmental barrier coating 12 may include mullite, barium strontium aluminosilicate (BSAS), barium aluminosilicate (BAS), cordierite, alumina, spodumine, eucryptite, strontium aluminosilicate (SAS), at least one free rare earth oxide, or combinations thereof. In some examples, the environmental barrier coating 12 may also include an additive. For example, the environmental barrier coating 12 may include at least one of $TiO_2$, $Ta_2O_5$, $HfSiO_4$, an alkali metal oxide, or an alkali earth metal oxide. The additive may be added to the environmental barrier coating 12 to modify one or more desired properties of the environmental barrier coating 12.

In some examples, the environmental barrier coating 12 may have a dense microstructure, a columnar microstructure, or a combination of dense and columnar microstructures. A dense microstructure may be more effective in preventing the infiltration of environmental contaminants, while a columnar microstructure may be more strain tolerant during thermal cycling. A combination of dense and columnar microstructures may be more effective in preventing the infiltration of environmental contaminants than a fully columnar microstructure while being more strain tolerant during thermal cycling than a fully dense microstructure. In some examples, an environmental barrier coating 12 with a dense microstructure may have a porosity of less than about 20 vol. %, such as less than about 15 vol. %, less than 10 vol. %, or less than about 5 vol. %, where porosity is measured as a percentage of pore volume divided by total volume of the environmental barrier coating 12. In various non-limiting embodiments, all values and ranges of values including and between those set forth above are hereby expressly contemplated for use herein.

The environmental barrier coating 12 is not particularly limited in size, thickness, or other dimensions. In various embodiments, the environmental barrier coating 12 has a thickness of from about 0.5 to about 20 mils after pressure sintering. In other embodiments, the environmental barrier coating 12 has a thickness of about 1 to about 19, about 2 to about 18, about 3 to about 17, about 4 to about 16, about 5 to about 15, about 6 to about 14, about 7 to about 13, about 8 to about 12, about 9 to about 11, about 10, or about 5 to about 10, mils, after pressure sintering. Before pressure sintering, the environmental barrier coating 12 may have the same or a different thickness, as determined by one of skill in the art. In addition to the above, the environmental barrier coating 12 is not particularly limited relative to physical properties. Any environmental barrier coating 12 known in the art that includes a rare earth silicate may be used herein. In various non-limiting embodiments, all values and ranges of values including and between those set forth above are hereby expressly contemplated for use herein.

In various embodiments, the article 10 exhibits less than about a 50 percent debit in flexural strength as compared to a ceramic substrate that is free of the sintered environmental barrier coating 12, as determined using ASTM C1161. In other words, the article of this disclosure remains quite strong when including the environmental barrier coating 12. In other embodiments, the article 10 exhibits less than about a 45, 40, 35, 30, 25, 20, 15, 10, or 5, percent debit in flexural strength as compared to a ceramic substrate that is free of the sintered environmental barrier coating 12, as determined using ASTM C1161. In various non-limiting embodiments, all values and ranges of values including and between those set forth above are hereby expressly contemplated for use herein.

In other embodiments, the article 10 exhibits a certain adhesion after steam testing. For example, any steam testing protocol known in the art can be used, e.g. using steam cycles of varying times, such as about 15, or about 30 or about 60 minutes per cycle. For example, the article 10 may be exposed to steam from anywhere from 1 hour to thousands of hours, e.g. 2000 or more hours, at any steam temperature. In various embodiments, steam temperatures of from about 100 to about 1500, about 300 to about 1400, about 400 to about 1300, about 500 to about 1200, about 600 to about 1100, about 700 to about 1000, or about 800 to about 900, degrees Celsius, may be used. Without intending to be bound by theory, it is believed that steam can attack any silica and/or oxide layer disposed between the environmental barrier coating 12 and the surface 14 of the ceramic substrate 16. In various embodiments, after steam exposure, the article 10 can be evaluated for adhesion of the environmental barrier coating 12 to the surface 14 of the ceramic substrate 16, e.g. using ASTM C633. In some embodiments, the article 10 exhibits an adhesion of the environmental barrier coating 12 to the surface 14 of the ceramic substrate 16 of greater than 100, 200, 300, 400, 500, 600, 700, 800, 900, 1000, 1100, 1200, 1300, 1400, 1500, or more, psi, e.g. after steam exposure as described above for 100, 200, 300, 400, 500, 600, 700, 800, 900, 1000, 1100, 1200, 1300, 1400, 1500, 1600, 1700, 1800, 1900, or 2000, hrs, or more. In various non-limiting embodiments, all values and ranges of values including and between those set forth above are hereby expressly contemplated for use herein.

Method of Forming the Article:

This disclosure also provides a method for forming the article 10, as first introduced above. The method may be described as a method of pressure sintering the environmental barrier coating 12 on the surface 14 of the ceramic substrate 16 to form the article 10.

The method includes the step of etching the surface of the ceramic substrate, e.g. to texture the surface 14. Additionally or alternatively, the step of etching may be used to roughen the surface and/or remove any heat treatment (e.g. a silica layer) disposed on the surface 14 of the ceramic substrate 16, as provided from the manufacturer. Typically, it is desirable that the surface 14 of the ceramic substrate 16 be as clean as possible without any layer or residue disposed thereon. The step of etching can help form such a surface 14. It is also contemplated that the step of etching may be used to etch the first side 20 and the second side 22 of the ceramic substrate 16. Moreover, the step of etching can be used to etch the edges 24 of the ceramic substrate 16.

The step of etching may be conducted using any method or compound known in the art which may be described as an etchant. In various embodiments, the step of etching is further defined as etching using an acid or a base or a combination thereof, etching using a molten alkaline- and/or alkaline-earth metal hydroxide such as NaOH, plasma etching, etching using hydrofluoric acid, etching using aqueous pressurized KOH, or combinations thereof. The step of etching may be conducted at any temperature as selected by one of skill in the art. In various embodiments, the step of etching is conducted at a temperature of from about 25° C. to about 1500° C., about 50° C. to about 1250° C., about 100° C. to about 1000° C., about 250° C. to about 750° C., about 250° C. to about 500° C., about 300° C. to about 450° C., about 150° C. to about 300° C., about 350° C. to about 400° C., about 375° C. to about 450° C., about 100° C. to about 300° C., about 150° C. to about 250° C., or about 200° C. to about 250° C. In other embodiments, the step of etching is conducted for a time of from about 1 to about 60, about 5 to about 55, about 10 to about 50, about 15 to about 45, about 20 to about 40, about 25 to about 35, about 30 to about 35, or about 1, 2, 3, 4, 5, 6, 7, 8, 9, 10, 11, 12, 13, 14, or 15, minutes. Moreover, the step of etching may be repeated once or more than once, as determined by one of skill in the art. In various non-limiting embodiments, all values and ranges of values including and between those set forth above are hereby expressly contemplated for use herein.

The method may also include a step subsequent to the step of etching, e.g. cleaning the ceramic substrate 16 to neutralize the etchant. For example, an acid may be used to neutralize a basic etchant and a base may be used to neutralize an acidic etchant. Any known neutralizing agent can be used herein.

The step of cleaning the ceramic substrate 16 and/or neutralizing the etchant is not particularly limited in duration, temperature, pressure, etc. and may be determined by one of skill in the art. For example, the step of cleaning may also include utilizing one or more steps of rinsing with hot water, use of sonicators or other cleaning devices, and use of various temperatures. In one embodiment, a 20 wt % acidic solution is used for the step of cleaning at a temperature of from about 125° F. to about 175° F. Moreover, the step of cleaning may include a step of spraying the ceramic substrate 16 with an alcohol, such as isopropanol, to remove any residual water prior to the next step of the method. In various non-limiting embodiments, all values and ranges of values including and between those set forth above are hereby expressly contemplated for use herein.

The method also includes the step of disposing the environmental barrier coating 12 on the etched surface 14 of the ceramic substrate 16 wherein the environmental barrier coating 12 is as described above. The etched surface may be the etched first side 20, etched second side 22, and/or etched edges 24. This step may be alternatively described as disposing the environmental barrier coating 12 on the etched and neutralized/cleaned surface 14, e.g. if the immediately aforementioned step is utilized. The environmental barrier coating 12 may be disposed or applied to/on the surface 14 using any method known in the art. For example, the environmental barrier coating 12 may be applied using a spray application, dip application, silkscreen application, blade application, or a combination thereof. The particular parameters of one or more of these application methods may be chosen by one of skill in the art.

The environmental barrier coating 12 may be disposed on the substrate 14 as a paint, paste, or slurry, or as an aqueous or non-aqueous solution with surfactants, binders, plasticizers, known in the ceramic, paint and paste industries, e.g. particles of the rare earth silicate disposed in a solvent such as an alcohol. The slurry may also include a binder, which may be any known in the art. For example, the binder may be a plastic. Accordingly, the step of disposing the environmental barrier coating 12 may be further defined as disposing the rare earth silicate.

After the environmental barrier coating 12 is applied on/to the surface 14, the method may also include the step of drying the coating, e.g. if the environmental barrier coating 12 is wet or otherwise applied using a solvent or as a slurry. The step of drying is not particularly limited relative to time, temperature, or pressure and these parameters may be chosen by one of skill in the art. In various embodiments, the environmental barrier coating 12 is dried at atmospheric pressure. However, a lower pressure, such as a vacuum pressure, may be used. The environmental barrier coating 12 may be dried at room temperature or at an elevated temperature. In various embodiments, the environmental barrier coating 12 may be dried at a temperature of from about 50° C. to about 200° C., about 100° C. to about 150° C., or about 125° C. to about 150° C., for a time of from 1 to 30 minutes.

In various non-limiting embodiments, all values and ranges of values including and between those set forth above are hereby expressly contemplated for use herein.

The method may also include the optional step of debinding the environmental barrier coating 12. The step of debinding may be described as removing (e.g. burning off) all or a portion of a binder that is present in the environmental barrier coating 12. This binder is not required in the environmental barrier coating 12 such that the step of debinding also is not required. The step of debinding is not particularly limited and may be any known in the art. The step of debinding is typically utilized before sintering in an inert or nitrogen atmosphere because oxygen is required for burn-off of the binder. If the binder is not removed before sintering in the inert atmosphere (e.g. helium, neon, argon, krypton, xenon or also using nitrogen), there will not be sufficient oxygen present to bind with the carbon of the binder to form carbon dioxide and burn-off the binder. Instead, residual carbon will be left in place after sintering. Typically, this is undesirable because the presence of carbon can affect the chemistry of the bonding of the environmental barrier coating 12 to the surface 14 of the ceramic surface 16 which could ultimately degrade physical properties of the article 10.

Moreover, the particular parameters of this debinding step may be chosen by one of skill in the art. In various embodiments, the step of debinding occurs at a temperature of from about 150° C. to about 750° C., about 350° C. to about 700° C., about 400° C. to about 650° C., about 450° C. to about 600° C., or about 500° C. to about 550° C. The step of debinding may be conducted for any time as chosen by one of skill in the art, e.g. about 10 to about 60, about 15 to about 55, about 20 to about 50, about 25 to about 45, about 30 to about 40, about 35 to about 40, minutes. In various non-limiting embodiments, all values and ranges of values including and between those set forth above are hereby expressly contemplated for use herein.

The method may also include the step of placing the ceramic substrate 16 into the isostatic press (HIP) furnace. For example, the ceramic substrate 16 including the environmental barrier coating 12 disposed on the surface 14 thereof may be directly placed in the HIP furnace.

In a HIP unit, a high temperature furnace is typically enclosed in a pressure vessel. The temperature, pressure and process times are all controlled to achieve the optimum material properties. Typically, the ceramic substrate 16 including the environmental barrier coating 12 disposed on the surface 14 thereof is heated in an inert gas (such as helium, neon, argon, krypton, xenon) or nitrogen, which applies "isostatic" pressure uniformly in all directions. This causes the materials therein to become "plastic" allowing voids to collapse under the differential pressure. The surfaces of the voids diffusion bond together to effectively eliminate the defects achieving near theoretical density, while improving mechanical properties of the ceramic substrate 16 including the environmental barrier coating 12 disposed on the surface 14 thereof.

Use of the HIP furnace can reduce scrap and improve yield, reduce quality assurance requirements by improving material properties and reducing property scatter, maximize material utilization by improving material properties, allow for parameters to be established to minimize subsequent heat treatment requirements, allow the ceramic substrate 16 including the environmental barrier coating 12 disposed on the surface 14 thereof to exhibit higher reliability and longer service life, and can reduce overall production costs.

Notwithstanding the above, the method further includes the step of pressure sintering the environmental barrier coating 12 on the etched surface 14 of the ceramic substrate 16 in an inert or nitrogen atmosphere at a pressure of greater than atmospheric pressure such that at least a portion of the environmental barrier coating 12 is disposed in the texture 18 of the surface 14 of the ceramic substrate 16 thereby forming the article 10. The step of pressure sintering typically utilizes the HIP furnace described above but may alternatively utilize any alternative method of pressure sintering known in the art. As first described above, pressure sintering involves sintering in an inert or nitrogen atmosphere at a pressure of greater than atmospheric pressure. This results in at least a portion of the environmental barrier coating 12 being disposed in the texture 18 of the surface 14 of the ceramic substrate 16 thereby forming the article 10. In various embodiments, the step of pressure sintering produces a mass of the environmental barrier coating 12 that includes liquid glass and the liquid glass is disposed in the texture 18 of the surface 14 of the ceramic substrate 16. In various embodiments, the step of pressure sintering produces a mass of the environmental barrier coating 12 including about 0.1 to about 20, about 0.5 to about 20, about 1 to about 20, about 5 to about 15, about 5 to about 10, about 10 to about 15, or about 15 to about 20, weight percent of the liquid glass based on a total weight of the environmental barrier coating 12. In various non-limiting embodiments, all values and ranges of values including and between those set forth above are hereby expressly contemplated for use herein.

The specific parameters of the pressure sintering may be chosen by one of skill in the art. For example, the inert atmosphere may be any noble gas and/or nitrogen may be used. The time and temperature and specific sintering profile may also be chosen by one of skill in the art.

In various embodiments, the sintering profile includes sintering at a temperature of from about 1400° C. to about 1700° C., about 1450° C. to about 1650° C., about 1400° C. to about 1600° C. about 1500° C. to about 1600° C., or about 1500° C. to about 1550° C. In other embodiments, the sintering profile includes sintering for a time of from about 1 to about 60, about 5 to about 55, about 10 to about 50, about 15 to about 45, about 20 to about 40, about 25 to about 35, or about 30 to about 35, minutes. In further embodiments, the sintering profile includes sintering using any inert gas such as a noble gas, e.g. helium, neon, argon, krypton, xenon, or nitrogen. In other embodiments, the sintering profile includes sintering at a pressure of from about 1 to about 30,000, about 100 to about 25,000, about 500 to about 20,000, about 1,000 to about 15,000, about 1,500 to about 10,000, about 2,000 to about 5,000, about 100 to about 1,000, about 200 to about 900, about 300 to about 800, about 400 to about 700, about 500 to about 600, about 10 to about 100, about 20 to about 100, about 25 to about 75, about 25 to about 50, about 50 to about 100, or about 75 to about 100, psi. In still other embodiments, any parameters that typically are used with a HIP furnace can be used herein. Moreover, any ramp-up of the temperature and/or pressure of the HIP furnace may be used. In various non-limiting embodiments, all values and ranges of values including and between those set forth above are hereby expressly contemplated for use herein.

Once the step of pressure sintering is completed, the article 10 is formed. The article 10 may then be evaluated to determine various physical and chemical properties, e.g. as described above. Alternatively, the article 10 may then be used or may be subjected to further processing, as chosen by one of skill in the art.

EXAMPLES

A series of examples both according to this disclosure and comparative are evaluated. In a first series of examples, 1" diameter discs of silicon nitride ceramic substrate are used to form various articles. In a second series of examples, MIL-B bars of silicon nitride ceramic substrates are used to form additional articles.

In the first series of examples, the 1" diameter discs are etched using molten sodium hydroxide at a temperature of from about 315° C. to about 425° C. for a time of from about 3 to about 5 minutes. Subsequently, the discs are cleaned and neutralized using a 20 wt % acidic solution, a series of water rinses, and a series of sonications. An environmental barrier coating is then screen printed on the discs to ensure consistent thickness.

The environmental barrier coating is utilized as a slurry of particles of Ytterbium Silicate in an alcohol solvent including plastic binder. The discs are then dried at a temperature of from about 50° C. to about 200° C. for a time of from about 5 to about 15 minutes. Then, the discs are subjected to debinding at a temperature of from about 500° C. to about 700° C. for a time of from about 15 minutes to about 60 minutes. Then, the discs are placed in a HIP furnace and the sintering profile is run, e.g. using the parameters set forth below.

Sintering Temperature: About 1400° C. to about 1700° C.;
Sintering Time: About 1 minute to about 60 minutes;
Sintering Gas: helium, neon, argon, krypton, xenon, or nitrogen
Sintering Pressure: About 50 psi.

After sintering, a series of articles formed according to this disclosure are produced and prepared for further evaluation.

A series of comparative articles are also prepared.

A first comparative article is obtained from a commercially available source and includes a rare earth silicate thought to be ytterbium silicate that is bonded to a surface of a silicon nitride ceramic substrate using a plasma spray process.

A second comparative article is formed using the aforementioned procedure of this disclosure except that an air furnace is used instead of an inert atmosphere. More specifically, the following parameters are utilized:

Sintering Temperature: About 1400° C. to about 1700° C.;
Sintering Time: About 1 minute to about 60 minutes;
Sintering Gas: Atmospheric Air;
Sintering Pressure: About 100 to about 10,000 psi.

The environmental barrier coating used in this comparative article is the same as is described above relative to the method of this disclosure, i.e., ytterbium silicate.

A third comparative article is formed using a plasma spray process and includes a silicon bond layer disposed between the environmental barrier coating and the silicon nitride. The environmental barrier coating used in this comparative article is the same as is described above relative to the method of this disclosure, i.e., ytterbium silicate.

After formation, the articles of this disclosure and the first, second, and third comparative articles are evaluated to determine adhesion per ASTM C633 and flexural strength per ASTM C1161.

To determine adhesion using ASTM C633, the articles of this disclosure and the first, second, and third comparative articles are exposed to high pressure steam at approximately 1200° C. for a certain number of hours. After this chosen number of hours passes, the articles are then evaluated to determine adhesion of the environmental barrier coating to the surface of the silicon nitride ceramic substrate. An adhesion value of greater than 1,000 psi is set as the minimum threshold for the adhesion to be considered successful. The results of these evaluations are shown below in Table 1.

TABLE 1

|  | Articles of This Disclosure | Comparative Article 1 | Comparative Article 2 | Comparative Article 3 |
| --- | --- | --- | --- | --- |
| Steam Exposure Time (hrs) | ~2,000+ | 0 | ~400 | 120 |
| Adhesion (psi) | >~1,000 | <~50 | <~50 | <~50 |
| Results | Pass | Fail | Fail | Fail |

These results show that even after 2,000 hours of steam exposure, the articles of this disclosure still retain excellent adhesion of greater than 1,000 psi as determined using ASTM C633. The environmental barrier coating of Comparative Article 1 does not adhere. Comparative Articles 2 and 3 also fail the adhesion test and fail after short times of steam exposure.

In the second series of examples, the MIL-B bars undergo the same steps as described above relative to the 1" discs such that the same environmental barrier coating is disposed thereon. This forms similar articles representative of this disclosure and similar comparative articles, as described above. After formation, the MIL-B bars do not undergo steam exposure.

To determine flexural strength using ASTM C1161, the articles of this disclosure and the first, second, and third comparative articles are bent to breaking. Typically, the flexural strength of an article that includes a coating is less than the flexural strength of that same article that is free of the coating. This is thought to result from a pressure wave generated from the breaking of the coating extending through the ceramic substrate and breaking the ceramic substrate. The results of these evaluations are set forth below in Table 2.

TABLE 2

|  | Articles of This Disclosure | Comparative Article 1 | Comparative Article 2 | Comparative Article 3 |
| --- | --- | --- | --- | --- |
| Flexural Strength Before Coating (ksi) | 66 | 66 | 66 | 66 |
| Flexural Strength After Coating (ksi) | 51 | No Adhesion | 19 | Detachment of plasma spray coating from bondcoat |
| Debit in Flexural Strength After Coating (%) | 22% | N/A | 70% | N/A |

These results show that the articles of this disclosure exhibit much less debit in flexural strength than each of the Comparative Articles 1-3.

The typical industry doctrine requires that a compliant layer (such as a bondcoat) be used with an environmental barrier coating (EBC), e.g. as set forth in Comparative Article 3. The purpose of this is because the industry recognized that the bondcoat is needed so that the EBC can adhere to the ceramic substrate, such as the silicon nitride. In fact, for over 20 years, the industry has been pursuing a solution to directly adhering an EBC, such as a rare earth silicate, to silicon nitride. No efforts have been successful. In fact, use of a plasma spray (such as in Comparative Article 1) results in practically no adhesion of the EBC whatsoever.

Comparative Article 1 differs from Comparative Article 3 in that the EBC of Comparative Article 1 did not adhere whatsoever, even before the steam testing, such that no further evaluation could be made relative to a debit in flexural strength. Comparative Article 3 exhibited an EBC that initially adhered to the ceramic via a bondcoat. However, after steam testing, oxygen seeped through cracks in the EBC and attached the silicon interface thereby converting the silicon to silica. As is known in the art, silica is very susceptible to volatilization when exposed to high temperatures and moisture. Accordingly, in the steam testing, the high temperature and the steam caused the silica to volatilize. This, in turn, causes the EBC itself to disappear thus leaving only an unprotected and uncoated ceramic. Due to the lack of an EBC disposed on the ceramic, Comparative Article 3 was not able to be further evaluated relative to determining a debit in flexural strength.

The results surprisingly indicate that the method and article of this disclosure can be used in high temperature and high moisture environments with excellent results. In fact, the articles of this disclosure are not that different from Comparative Articles 2 and 3. Comparative Article 2 is almost identical to the articles of this disclosure except that it is formed in a furnace using atmospheric air. This, in essence, simply replaces the oxide layer on the ceramic surface that was previously removed with etching. Once this oxide layer is present, it is then volatilized when exposed to the high temperatures and the moisture from the steam. At that point, Comparative Article 2 behaves in a similar way as Comparative Article 3. However, at the end of the testing, Comparative Article 2 still included some amount of the EBC disposed on the ceramic substrate. As the data indicates, the debit in flexural strength of Comparative Article 2 is quite high thereby indicating that the Comparative Article 2 does not perform nearly as well as the articles of this disclosure. It is this drastic difference in performance that is very surprising to those of skill in the art, especially when the articles of this disclosure are, at first blush, very similar to the Comparative Articles 2 and 3. Despite these similarities, the articles of this disclosure perform to such a higher degree, it is totally unexpected by one of skill in the art. Without intending to be bound by theory, it is believed that these differences are due to controlling the chemistry of the surface of the ceramic substrate and preventing, as much as possible, the deposition of an oxide or silica layer (such as in Comparative Article 2). Moreover, this disclosure solves a long-standing problem and need in the industry that has existed for 20+ years of how to form an article that includes an EBC adhered to a ceramic substrate, without a bondcoat, that is high performing and actually outperforms all of the current industry standards.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A method of pressure sintering an environmental barrier coating on a surface of a ceramic substrate to form an article, said method comprising the steps of:
   A. etching the surface of the ceramic substrate to texture the surface;
   B. disposing an environmental barrier coating on the etched surface of the ceramic substrate wherein the environmental barrier coating comprises a rare earth silicate and is free of cordierite; and
   C. pressure sintering the environmental barrier coating on the etched surface of the ceramic substrate in an inert or nitrogen atmosphere at a pressure of from about 20 psi to about 100 psi such that at least a portion of the environmental barrier coating is disposed in the texture of the surface of the ceramic substrate and such that the environmental barrier coating is disposed on and in direct contact with the substrate thereby forming the article;
   wherein said step of pressure sintering is conducted in a hot isostatic press furnace.

2. The method of claim 1 wherein the environmental barrier coating is disposed on and in direct contact with the surface of the ceramic substrate such that there is no oxide layer and/or silica layer disposed between the environmental barrier coating and the surface of the ceramic substrate.

3. The method of claim 1 wherein the article exhibits less than about a 50 percent debit in flexural strength as compared to a ceramic substrate that is free of the environmental barrier coating, as determined using ASTM C1161.

4. The method of claim 3 wherein the article exhibits an adhesion of greater than about 1,000 psi as determined using ASTM C633 measured after exposure to steam at a temperature of about 1200° C. for a time of greater than about 2,000 hours.

5. The method of claim 1 wherein said step of pressure sintering produces a mass of the environmental barrier coating comprising from about 0.1 to about 20 weight percent of liquid glass based on a total weight of the environmental barrier coating and said liquid glass is disposed in the texture of the surface of the ceramic substrate.

6. The method of claim 1 wherein said step of pressure sintering occurs at a temperature of from about 1400° C. to about 1700° C.

7. The method of claim 1 wherein the environmental barrier coating has a thickness of from about 0.5 mils to about 20 mils after said step of pressure sintering.

8. The method of claim 1 wherein the environmental barrier consists essentially of the rare earth silicate.

9. The method of claim 1 wherein the environmental barrier consists of the rare earth silicate.

10. The method of claim 1 wherein the pressure is from about 25 psi to about 75 psi.

11. The method of claim 1 wherein the rare earth silicate comprises a rare earth monosilicate, a rare earth disilicate, or combinations thereof.

12. The method of claim 11 wherein the rare earth silicate is ytterbium silicate.

13. The method of claim 12 wherein the environmental barrier consists essentially of the ytterbium silicate and wherein the pressure is from about 25 psi to about 75 psi.

14. The method of claim 12 wherein the ytterbium silica comprises ytterbium monosilicate, ytterbium disilicate, or combinations thereof.

15. A method of pressure sintering an environmental barrier coating on a surface of a ceramic substrate to form an article, said method comprising the steps of:
   A. etching the surface of the ceramic substrate;
   B. disposing an environmental barrier coating on the etched surface of the ceramic substrate wherein the environmental barrier coating comprises ytterbium silicate and is free of cordierite; and
   C. pressure sintering the environmental barrier coating on the etched surface of the ceramic substrate in a hot isostatic press furnace utilizing an inert or nitrogen atmosphere at a pressure of from about 20 psi to about 100 psi, at a temperature of from about 1400° C. to about 1700° C., and for a time of from about 1 to about 60 minutes, such that at least a portion of the environmental barrier coating is disposed in the texture of the surface of the ceramic substrate and such that the environmental barrier coating is disposed on and in direct contact with the substrate thereby forming the article,
   wherein said step of pressure sintering produces a mass of the environmental barrier coating comprising from about 0.1 to about 20 weight percent of liquid glass and said liquid glass is disposed in the texture of the surface of the ceramic substrate;
   wherein the environmental barrier coating has a thickness of from about 0.5 mils to about 20 mils after said step of pressure sintering,
   wherein the article exhibits less than a 50 percent debit in flexural strength as compared to a ceramic substrate that is free of the environmental barrier coating, as determined using ASTM C1161, and
   wherein the article exhibits an adhesion of greater than about 1,000 psi as determined using ASTM C633 measured after exposure to steam at a temperature of about 1200° C. for a time of greater than about 2,000 hours.

16. The method of claim 15 wherein the environmental barrier coating is disposed on and in direct contact with the surface of the ceramic substrate such that there is no oxide layer and/or silica layer disposed between the environmental barrier coating and the surface of the ceramic substrate.

17. The method of claim 15 wherein the environmental barrier consists essentially of the rare earth silicate.

18. The method of claim 15 wherein the environmental barrier consists of the rare earth silicate.

19. The method of claim 15 wherein the pressure is from about 25 psi to about 75 psi.

20. A method of pressure sintering an environmental barrier coating on a surface of a ceramic substrate to form an article, said method comprising the steps of:
   A. etching the surface of the ceramic substrate;
   B. disposing an environmental barrier coating on the etched surface of the ceramic substrate wherein the environmental barrier coating consists essentially of ytterbium silicate and is free of cordierite; and
   C. pressure sintering the environmental barrier coating on the etched surface of the ceramic substrate in a hot isostatic press furnace utilizing an inert or nitrogen atmosphere at a pressure of about 50 psi, at a temperature of from about 1400° C. to about 1700° C., and for a time of from about 1 to about 60 minutes, such that at least a portion of the environmental barrier coating is disposed in the texture of the surface of the ceramic substrate and such that the environmental barrier coating is disposed on and in direct contact with the substrate thereby forming the article wherein there is no oxide layer and/or silica layer disposed between the environmental barrier coating and the surface of the ceramic substrate, wherein said step of pressure sintering produces a mass of the environmental barrier coating comprising from about 0.1 to about 20 weight percent of liquid glass and said liquid glass is disposed in the texture of the surface of the ceramic substrate, wherein the environmental barrier coating has a thickness of from about 0.5 mils to about 20 mils after said step of pressure sintering, wherein the article exhibits less than a 25 percent debit in flexural strength as compared to a ceramic substrate that is free of the environmental barrier coating, as determined using ASTM C1161, wherein the article exhibits an adhesion of greater than about 1,000 psi as determined using ASTM C633 measured after exposure to steam at a temperature of about 1200° C. for a time of greater than about 2,000 hours; and wherein the article is free of a bondcoat.

* * * * *